(12) United States Patent
Nakamura

(10) Patent No.: US 8,334,904 B2
(45) Date of Patent: Dec. 18, 2012

(54) VEHICLE SURROUNDINGS MONITORING SYSTEM AND VEHICLE FOOT ILLUMINATING SYSTEM

(75) Inventor: Keiichi Nakamura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 366 days.

(21) Appl. No.: 12/682,694

(22) PCT Filed: Nov. 18, 2008

(86) PCT No.: PCT/IB2008/003121
§ 371 (c)(1),
(2), (4) Date: Apr. 12, 2010

(87) PCT Pub. No.: WO2009/066150
PCT Pub. Date: May 28, 2009

(65) Prior Publication Data
US 2010/0244698 A1    Sep. 30, 2010

(30) Foreign Application Priority Data
Nov. 19, 2007    (JP) .................................. 2007-299129

(51) Int. Cl.
*H04N 7/18* (2006.01)
(52) U.S. Cl. ........................................................ 348/148
(58) Field of Classification Search ................... 348/148
See application file for complete search history.

(56) References Cited

U.S. PATENT DOCUMENTS
6,118,372 A    9/2000   Leow
7,175,320 B1   2/2007   Burgess
2004/0233677 A1   11/2004   Su et al.
2008/0232123 A1   9/2008   Onopa et al.

FOREIGN PATENT DOCUMENTS

| DE | 103 58 183 | 7/2005 |
|---|---|---|
| JP | 7 228191 | 8/1995 |
| JP | 08-324342 | 12/1996 |
| JP | 2002 240629 | 8/2002 |
| JP | 2004 182040 | 7/2004 |
| JP | 2004-231051 | 8/2004 |
| JP | 2004 311299 | 11/2004 |
| JP | 2005 178657 | 7/2005 |
| JP | 2005-212754 | 8/2005 |
| WO | 2006 062514 | 6/2006 |

OTHER PUBLICATIONS

Japanese Office Action issued on Aug. 11, 2009 in JP 2007-299129 with English translation.

*Primary Examiner* — Larry Donaghue
*Assistant Examiner* — Marshall McLeod
(74) *Attorney, Agent, or Firm* — Oblon, Spivak, McClelland, Maier & Neustadt, L.L.P.

(57) ABSTRACT

A vehicle surroundings monitoring system includes: an image pick-up device (10) that picks up an image of an area on the passenger side of a vehicle (200); a display device (30) that displays the image of the area on the passenger side of the vehicle, which is picked up by the image pick-up device; a foot illuminating device (40) that illuminates the ground outside the vehicle on the passenger side, —and a foot illumination controller (50) that controls the foot illuminating device, wherein when the image of the area on the passenger side of the vehicle, which is picked up by the image pick-up device, is being displayed on the display device, the foot illumination controller turns off the foot illuminating device.

13 Claims, 8 Drawing Sheets

FIG. 7

STATE TRANSITION DIAGRAM:

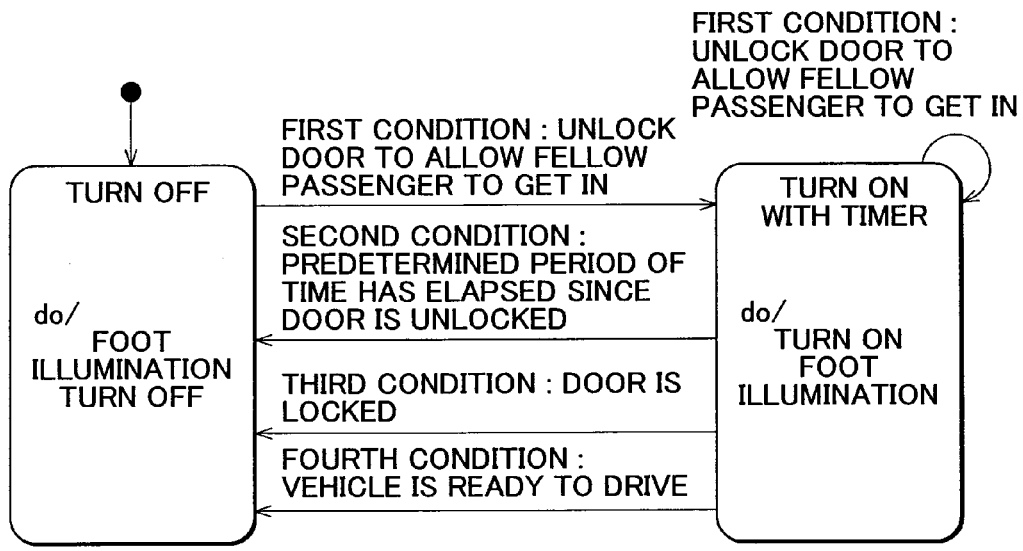

DESCRIPTION OF STATE:

| NAME OF STATE | DESCRIPTION |
|---|---|
| TURN ON WITH TIMER | STATE IN WHICH FELLOW PASSENGER IS NEAR VEHICLE, AND FOOT ILLUMINATION IS TURNED ON FOR PREDETERMINED PERIOD OF TIME IN ORDER TO ENSURE SAFETY ON THE GROUND OUTSIDE VEHICLE |
| TURN OFF | STATE IN WHICH FELLOW PASSENGER IS NOT PRESENT OR IS SEATED, AND FOOT ILLUMINATION IS TURNED OFF BECAUSE IT IS UNNECESSARY TO ENSURE SAFETY ON THE GROUND OUTSIDE VEHICLE |

VEHICLE SURROUNDINGS MONITORING SYSTEM AND VEHICLE FOOT ILLUMINATING SYSTEM

BACKGROUND OF THE INVENTION

1. Field of the Invention

The present invention relates to a vehicle surroundings monitoring system and a vehicle foot illuminating system and, more particularly, to a vehicle surroundings monitoring system that displays the image of an area on the front passenger side of a vehicle and a vehicle foot illuminating system that illuminates the ground outside the vehicle on the front passenger side.

2. Description of the Related Art

A vehicle road surface illuminating system described, for example, in Japanese Patent Application Publication No. 7-228191(JP-A-7-228191) is known. The vehicle road surface illuminating system includes a lamp that is provided near a door and that illuminates a road surface; a power supply circuit that supplies electric power to the lamp; a control circuit that receives a lock/unlock signal through remote control to control lock/unlock of the door; and an energizing circuit that receives the unlock signal through the remote control to turn on the power supply circuit for a predetermined period of time and that forcibly turns off the power supply circuit on the basis of an input of at least one of a vehicle running signal indicating that the vehicle is running or a vehicle energization signal indicating that the vehicle is energized. The lamp remains on to illuminate the road surface until the driver gets in the vehicle and, after the driver gets in the vehicle, the lamp is turned off prior to vehicle running.

According to the configuration described in JP-A-7-228191, when the illumination is forcibly terminated by the input of the vehicle running signal or the vehicle energization signal, it does not cause any problem when the occupant is the driver only; however, when another occupant gets into a front passenger seat of the vehicle, there is a possibility that the illumination may not remain on until the occupant gets into the front passenger seat.

Incidentally, a vehicle surroundings monitoring system, called side monitor, is known. The vehicle surroundings monitoring system displays an image by picking up the image of an area on the passenger side of the vehicle with a CCD camera, or the like, to assist the driver in viewing an area on the left side of the vehicle. Thus, the vehicle surroundings monitoring system helps the driver avoid a scrape or a graze against an obstacle due to a difference in turning radius between the left front wheel and the left rear wheel at a left turn.

If the road surface illuminating system described in JP-A-7-228191 is applied to the vehicle provided with the vehicle surroundings monitoring system, when the lamp is turned on to illuminate a road surface while the image of an area on the vehicle side is being displayed through the camera, a so-called smear phenomenon, that is, a phenomenon that, as a high luminance point is picked up by the camera, the point is trailed up and down, occurs due to the influence of the turned-on illumination in the image of the area on the vehicle side or, because the focal point is set to a light source, the side camera does not operate desirably. Thus, visibility decreases.

SUMMARY OF THE INVENTION

The invention provides a vehicle surroundings monitoring system and vehicle foot illuminating system that have both the function of illuminating the ground around occupant's feet when the occupant gets into the front passenger seat and the function of displaying the image of an area on the vehicle side, while suppressing a smear phenomenon, or the like, of the image of an area on the vehicle side to implement antiglare on a picked-up image.

A first aspect of the invention provides a vehicle surroundings monitoring system. The vehicle surroundings monitoring system includes: an image pick-up device that picks up an image of an area on the passenger side of a vehicle; a display device that displays the image of the area on the passenger side of the vehicle, which is picked up by the image pick-up device; a foot illuminating device that illuminates the ground outside the vehicle on the passenger side; and a foot illumination controller that controls the foot illuminating device, wherein when the image of the area on the passenger side of the vehicle, which is picked up by the image pick-up device, is being displayed on the display device, the foot illumination controller turns off the foot illuminating device.

According to the first aspect, it is possible to prevent the occurrence of a smear phenomenon on the image of an area on the passenger side of the vehicle and the occurrence of a state in which the entire image is whity because of losing the white balance. Thus, it is possible to prevent a decrease in visibility of the image of an area on the passenger side of the vehicle.

In the first aspect, the image pick-up device and the foot illuminating device may be provided at a passenger side door mirror.

By so doing, the image pick-up device and the foot illuminating device may be provided at a position that is suitable for picking up the image of an area on the passenger side of the vehicle and illuminating the ground around the front passenger door and that allows easy assembly in terms of working. Thus, it is possible to improve both the function and assembly for the vehicle surroundings monitoring system.

In addition, in the first aspect, the vehicle surroundings monitoring system may further include an image pick-up controller that controls the image pick-up device, wherein the image pick-up controller may transmit an image pick-up operating state signal or a turn-off command signal to the foot illumination controller when the image pick-up controller is controlling the image pick-up device to pick up an image, and the foot illumination controller may turn off the foot illuminating device when the foot illumination controller has detected the image pick-up operating state signal or the turn-off command signal.

By so doing, it is possible to execute a control for turning off the foot illumination early at the time when a signal that indicates an image pick-up operating state is received. Thus, it is possible to implement a quick response control.

In addition, in the first aspect, while the image of the area on the passenger side of the vehicle is not being displayed on the display device, the foot illumination controller may turn on the foot illuminating device for a predetermined period of time when a vehicle power is on and a front passenger side door is unlocked.

By so doing, while the image of the area on the passenger side of the vehicle is not being displayed, there is no possibility that the driver feels the image dazzling. Thus, it is possible to execute a control for illuminating the ground outside the vehicle on the passenger side to allow the passenger to comfortably get into the vehicle.

In the first aspect, the foot illumination controller may control the foot illuminating device to serve as a turn signal lamp while the vehicle is running.

By so doing, when a plurality of turn signal lamps are provided, a turn signal lamp provided on the vehicle side serves as the foot illuminating device, and similar anti-glare control may be executed in the vehicle surroundings monitoring system.

A second aspect of the invention provides a vehicle foot illuminating system. The vehicle foot illuminating system includes: a foot illuminating device that illuminates the ground outside a vehicle on the passenger side; a display device that displays a picked up image of an area on the passenger side of the vehicle; and a foot illumination controller that controls the foot illuminating device, wherein the foot illumination controller turns off the foot illuminating device when the image of the area on the passenger side of the vehicle is being displayed on the display device.

According to the second aspect, when foot illumination impairs displaying of the image of an area on the passenger side of the vehicle, the foot illuminating device is turned out. Thus, it is possible to turn on the foot illumination device only when the foot illumination does not influence driver's view at the image of an area on the passenger side of the vehicle.

In the second aspect, the foot illuminating device may be provided at a passenger side door mirror.

By so doing, it is possible to reliably illuminate a road surface on the ground outside the vehicle on the passenger side, and also it is possible to easily assemble the foot illuminating device.

In the second aspect, while the image of an area on the passenger side of the vehicle is not being displayed on the display device, the foot illumination controller may turn on the foot illuminating device for a predetermined period of time when a vehicle power is on and a front passenger side door is unlocked.

By so doing, when the image of an area on the passenger side of the vehicle is not being displayed and the passenger intends to get into the front passenger seat, it is possible to help the passenger get into the front passenger seat by illuminating the ground outside the vehicle on the passenger side for a predetermined period of time.

In the second aspect, the foot illumination controller may turn off the foot illuminating device when the front passenger door is locked.

By so doing, when the passenger has been seated in the vehicle, it is possible to reliably turn off the foot illumination that has completed its role.

In the second aspect, the foot illumination controller may turn off the foot illuminating device when a shift lever is at a position other than a parking range.

By so doing, when the vehicle is ready to run, it is possible to reliably turn off the foot illumination that has completed its role.

According to the first or second aspect of the invention, without impairing driver's view at the image of an area on the passenger side of the vehicle, it is possible to assist the passenger in getting into the front passenger seat.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 7 is a state transition diagram of turn-on/turn-off of the vehicle foot illuminating system according to the embodiment of the invention or the alternative embodiment of the invention.

DETAILED DESCRIPTION OF EMBODIMENTS

Embodiments of the invention will be described with reference to the accompanying drawings.

Figure 1:
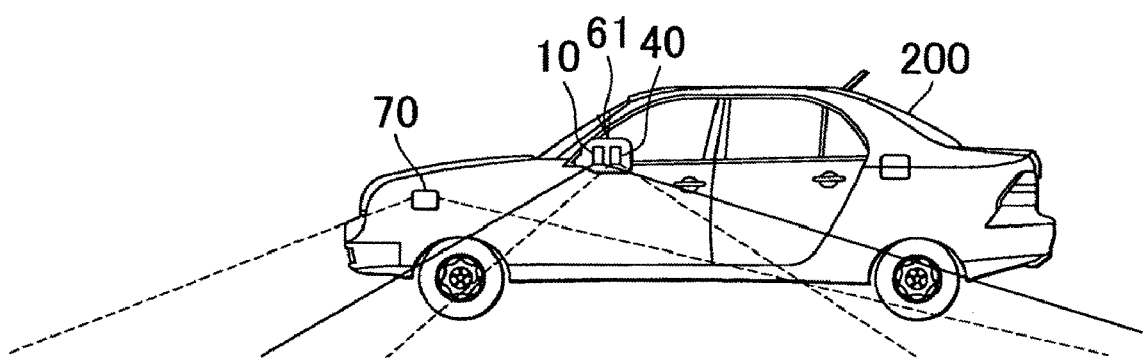
FIG. 1 is a view that shows the arrangement of a vehicle surroundings monitoring system and a vehicle foot illuminating system according to an embodiment of the invention.

FIG. 1 is a view that illustrates the arrangement of components of a vehicle surroundings monitoring system and vehicle foot illuminating system according to an embodiment of the invention. Referring to FIG. 1, an image pick-up device 10, which is a component of the vehicle surroundings monitoring system, and a foot illuminating device 40, which is a component of the vehicle foot illuminating system, according to the present embodiment are provided inside a passenger side door mirror 61 of a vehicle 200. The image pick-up device 10 and the foot illuminating device 40 are arranged adjacent to each other at a predetermined interval in a horizontal direction and oriented downward so that they can pick up the image of a road surface or illuminate a road surface. In addition, a turn signal lamp 70 is provided at the passenger side and front of the vehicle 200. Note that in the present embodiment, description will be given by taking a right-hand car of Japanese national specifications, for example, so that the passenger side means the left side of the vehicle 200; however, for a left-hand car of foreign specifications, the passenger side means the right side of the vehicle 200 and the present embodiment may also be similarly applied to the left-hand car.

The image pick-up device 10 picks up the image of an area on the passenger side of the vehicle 200. For example, a charge coupled device (CCD) camera, or the like, may be used as the image pick-up device 10. The image pick-up device 10 picks up the image of an area on the passenger side of the vehicle 200, which is a blind spot for the driver, and helps the driver view the area on the left lower side of the vehicle.

Figure 2:
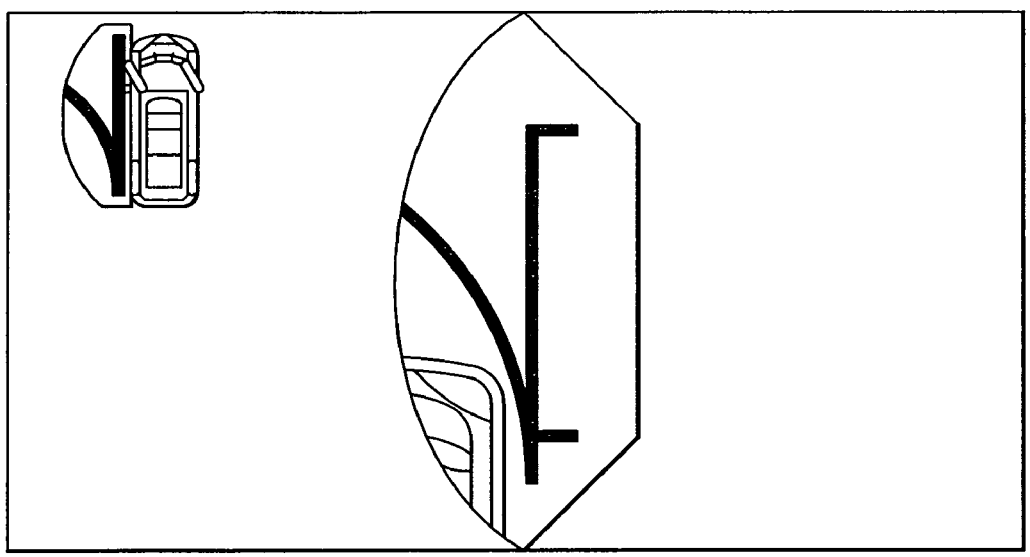
FIG. 2 is a view that shows an example of the image of an area on the passenger side of a vehicle, which is picked up by an image pick-up device.

FIG. 2 is a view that shows an example of an image of an area on the passenger side of the vehicle, which is picked up by the image pick-up device 10. Referring to FIG. 2, the right-hand side shows the image of the area on the passenger side of the vehicle, which is actually imaged by the image pick-up device 10, and the left-hand side shows the positional relationship between the image of the area on the passenger side of the vehicle and the vehicle 200. Then, a predicted course line in association with steering, a predictable minimum turning course line for maximum steering, and the like, are additionally displayed to help the driver avoid a scrape or a graze against an obstacle due to a difference in turning radius between the left front wheel and the left rear wheel at a left turn.

Note that the image pick-up device 10 is generally controlled by a switch for activation and deactivation on the basis of driver's intension. When the driver intends to display the image of the area on the passenger side of the vehicle in order to view the vehicle side and then turns on the switch, the image pick-up device 10 is activated.

Referring back to FIG. 1, the foot illuminating device 40 illuminates the ground outside the vehicle on the passenger side. The foot illuminating device 40 illuminates a road surface when the passenger intends to get into the front passenger seat to allow the passenger to get in while watching his or her step. It may be, so to speak, called welcome light.

In addition, the turn signal lamp 70, when the vehicle 200 turns left or turns right, indicates that intention for other vehicles, and the like. The turn signal lamp 70 is also provided at the front and rear of the vehicle 200, and a plurality of the turn signal lamps 70 are usually provided for one vehicle. However, FIG. 1 shows the turn signal lamp 70 that is provided at the left front side of the vehicle 200.

In FIG. 1, the solid lines extending radially downward from the door mirror 61 indicate an image pick-up area of which the image is picked up by the image pick-up device 10. On the other hand, the broken lines extending radially downward from the door mirror 61 indicate an illuminating area illuminated by the foot illuminating device 40. Similarly, the broken lines extending radially downward from the turn signal lamp 70 indicate an illuminating area illuminated by the turn signal lamp 70.

As shown in FIG. 1, the image pick-up area (solid lines) of the image pick-up device 10 and the illuminating area (broken lines) of the foot illuminating device 40 are partially overlapped, and the image pick-up area of the image pick-up device 10 almost incorporates the illuminating area of the foot illuminating device 40. Because of the above overlapped relationship, if the image of the area on the passenger side of the vehicle is picked up by the image pick-up device 10 while the foot illuminating device 40 remains on, the image of the area on the passenger side of the vehicle will be picked up in a state where illumination light enters the image pick-up area. In this state, for example, in the case where the CCD camera is used as the image pick-up device, when a high-luminance point is picked up by the camera, a smear phenomenon that the high-luminance point trails up and down occurs, or the focal point is set to the light source to lose the white balance of the image, resulting in a whity image. If such an image of an area on the passenger side of the vehicle is displayed on a display device, such as a screen inside the vehicle, not only the area on the passenger side of the vehicle is not properly displayed for driver's view but also the driver feels the image dazzling.

In addition, such an overlapped area is also present between the illuminating area (broken lines) of the turn signal lamp 70 and the image pick-up area (solid lines) of the image pick-up device 10. In this case, the turn signal lamp 70 and the image pick-up device 10 are not located adjacent to each other and located at a distance of about 50 cm or above from each other. However, when the image pick-up area and the illuminating area are overlapped, the image pick-up device 10 picks up a high-luminance light and, therefore, similar phenomena occur.

Then, in order to avoid the above situation, it is necessary to control the light source of the foot illuminating device 40, or the like, or control the image of an area on the passenger side of the vehicle, which is picked up by the image pick-up device 10. The vehicle surroundings monitoring system and foot illuminating system according to the present embodiment control the foot illuminating device 40 to avoid the above situation. Hereinafter, specific contents of the control will be described.

Figure 3:
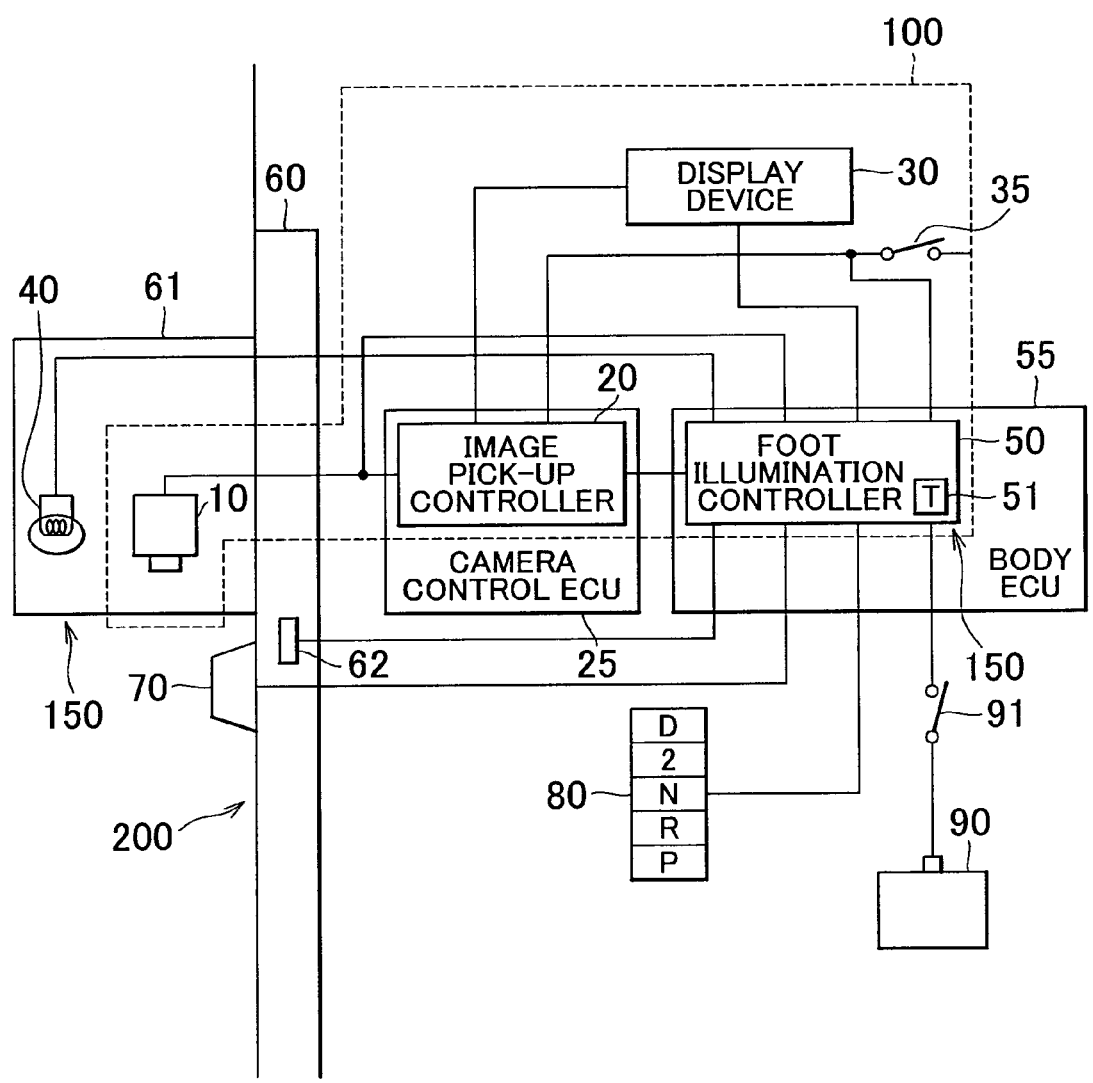
FIG. 3 is a functional block diagram of the vehicle surroundings monitoring system and foot illuminating system according to the present embodiment.

FIG. 3 is a functional block diagram that shows a schematic configuration of the vehicle surroundings monitoring system 100 and foot illuminating system 150. As shown in FIG. 3, the vehicle surroundings monitoring system 100 according to the present embodiment includes the image pick-up device 10, a display device 30, and a foot illumination controller 50, and, where appropriate, may further include an image pick-up controller 20. In addition, the foot illuminating system 150 according to the present embodiment includes the foot illuminating device 40 and a foot illumination controller 50. In addition, components related to the above apparatus and system include a camera control electronic control unit (ECU) 25, a display switch 35, a body ECU 55, a front passenger door 60, the door mirror 61, a front passenger door lock detector 62, the turn signal lamp 70, a shift lever position detector 80, a vehicle power 90 and a power switch 91.

The image pick-up device 10 images a vehicle side area as described above. The image pick-up device 10 may employs, other than the CCD cameral, a complementary metal oxide semiconductor (CMOS) camera or a previously used analog camera.

The image pick-up device 10 is installed so that a vertical downward direction is set as an imaging direction in order to image the lower side of the vehicle side area including a road surface. In addition, as shown in FIG. 1 and FIG. 3, the image pick-up device 10 is provided inside the passenger side door mirror 61. The image pick-up device 10 may be provided at various positions of the passenger side of the vehicle 200 as long as the image of the area on the passenger side of the vehicle can be appropriately picked up. For example, the image pick-up device 10 may be provided outside the passenger side door mirror 61, may be located at another position of the front passenger door 60, or may be provided at a relatively high position so as to expand the image pick-up area.

The image pick-up controller 20 controls the image pick-up device 10. The image pick-up controller 20 controls the image pick-up state or image pick-up condition of the image pick-up device 10 and also transmits, to another controller, a signal that indicates the image pick-up state of whether the image pick-up device 10 is picking up an image, or the like, and a turn-off command signal that causes the foot illuminating device 40 to turn out. In addition, the image pick-up controller 20 receives a signal form another controller and, on the basis of the received signal, changes the image pick-up state of the image pick-up device 10. In the vehicle surroundings monitoring system 100 according to the present embodiment, the image pick-up controller 20 executes a control for transmitting an image pick-up operating state signal that indicates that the image pick-up device 10 is picking up an image or a turn-off command signal that causes the foot illuminating device 40 to turn off to the foot illumination controller 50, which will be described later, and a control for suppressing an image picked up by the image pick-up device 10 by receiving an turned-on signal that indicates that the turn signal light 70 is being turned on from the foot illumination controller 50. Note that specific control contents executed by the image pick-up controller 20 will be described later in greater detail.

The image pick-up controller 20 is an arithmetic processing unit that executes arithmetic processing for image pick-up control, and may be implemented by an electronic circuit, a microprocessing unit (MPU) or an application specific integrated circuit (ASIC), for executing arithmetic processing.

Thus, the image pick-up controller 20 may be separately formed as the arithmetic processing unit, or may be, for example, formed integrally as portion of the camera control ECU 25 that controls overall an on-board camera, including the image pick-up device 10.

The display device 30 displays the image of the area on the passenger side of the vehicle, which is picked up by the image pick-up device 10, and may be arranged in the compartment of the vehicle 200 so that the driver can easily view it. The display device 30 is formed as a screen display. The display device 30 may be arranged in an instrument panel or on an instrument panel, or may be in a form such that an image is displayed on a front window shield glass like a head-up display. The display device 30 may employ various forms as long as the driver can view the image of the area on the passenger side of the vehicle.

The display switch 35 is an on/off switch or a selector switch that switches whether the image pick-up device 10 is activated to cause the display device 30 to display the image of the area on the passenger side of the vehicle. When the vehicle 200 has only the image pick-up device 10 (hereinafter, also referred to as "side monitor" or "side camera") for picking up the image of the area on the passenger side of the vehicle, as an on-board camera, the display switch 35 simply serves as an on/off switch. When the vehicle 200 has another on-board camera, such as a back side monitor, the display switch 35 will also serve as a selector switch as to which image of an on-board camera is displayed from among those on-board cameras.

The foot illuminating device 40 illuminates the ground outside the vehicle on the passenger side. The foot illuminating device 40, when a passenger gets into the passenger seat of the vehicle 200, illuminates a road surface around passenger's feet for brightness and allows the passenger to easily get in the vehicle. The foot illuminating device 40 may employ various types of light-emitting devices, such as a light bulb, a light emitting diode (LED), or the like, as long as it can appropriately illuminate a road surface around the front passenger door.

The foot illuminating device 40 is installed so that the illumination is oriented downward in order to illuminate a road surface or passenger's feet. In addition, the foot illuminating device 40 is provided inside the passenger side door mirror 61 in FIG. 1 and FIG. 3. Instead, the foot illuminating device 40 may be provided at another location on the passenger side as long as the foot illuminating device 40 can illuminate a road surface around the front passenger door of the vehicle 200. For example, the location may be outside the door mirror 61 or may be at a further front side of the vehicle 200 as in the case of the turn signal lamp 70 shown in FIG. 1. The foot illuminating device 40 may be provided at an appropriate position in response to application as long as the foot illuminating device 40 can appropriately illuminate passenger's feet or a road surface outside the vehicle on the passenger side so that the passenger is able to view the ground under the feet.

Note that the foot illuminating device 40 illuminates the ground outside the vehicle on the passenger side when the vehicle 200 is stopped or parked. Thus, the foot illuminating device 40 does not operate during running of the vehicle 200, so that it may be used to serve as a turn signal light during running. This will be described later.

The foot illumination controller 50 controls the foot illuminating device 40. The foot illumination controller 50 controls turn-on/turn-off of the foot illuminating device 40 on the basis of various conditions input thereto. Thus, the foot illumination controller 50 is connected to the foot illuminating device 40 and is also connected to a passenger seat door lock detector 62, a shift lever position detector 80 and a vehicle power 90. On the basis of these conditions, the foot illumination controller 50 normally controls the foot illuminating device 40 to turn on or turn out. In addition, the foot illumination controller 50 is connected to the image pick-up device 10, the display device 30 or the display switch 35 and, where necessary, further connected to the image pick-up controller 20 and/or the turn signal lamp 70. The foot illumination controller 50 preferentially controls the foot illuminating device 40 to turn off depending on a display state of the image of the area on the passenger side of the vehicle even when the condition satisfies that the normal control is a turn-on state.

The foot illumination controller 50 may be provided with a timer 51 for measuring time, where appropriate, so as to be able to execute a control for, when the foot illuminating device 40 is turned on, maintaining the turn-on state for a predetermined period of time and turning off the foot illuminating device 40 after the predetermined period of time has elapsed.

The foot illumination controller 50 may be formed of an electronic circuit, a CPU, an ASIC, or the like, which is a arithmetic processing unit, for executing the above described control. In addition, the foot illumination controller 50 may be formed separately. Instead, because the body ECU 55 controls overall a lighting system, an electric mirror system, a power window, and the like, the foot illumination controller 50 may be formed integrally as portion of the body ECU 55. By so doing, the foot illumination controller 50 may be implemented as portion of the MPU of the body ECU 55.

Normal control executed by the foot illumination controller 50 is, for example, executed on the basis of a state of the passenger seat door lock detector 62, the vehicle power 90 and/or the shift lever position detector 80. For example, when it is detected that the vehicle power 90 is on from the power switch 91, it is determined that the driver is seated. Furthermore, in this state, when the passenger seat door lock detector 62 detects that the front passenger door 60 is unlocked, it is determined that the driver is ready to allow a passenger to get into the passenger seat to thereby execute a control for turning on the foot illuminating device 40. At this time, the position of the shift lever may also be added to the condition, that is, for example, when the position of the shift lever is at a parking range P and the vehicle is parked, the foot illuminating device 40 may be turned on. Furthermore, a control condition may set various conditions, such as the case in which the shift lever is set at a neutral range N or an ignition on-state is required as the condition of the vehicle power 90.

Note that the duration of illumination of the foot illuminating device 40 may be set to a selected period of time, for example, about 15 seconds, and the duration may be measured, for example, by the timer 51.

On the other hand, as for the condition for turning off the foot illuminating device 40, for example, when the passenger seat door lock detector 62 detects that the front passenger door 60 is locked, it is determined that the passenger has been seated, and the foot illuminating device 40 may be turned out. In addition, for example, when the shift lever position detector 80 detects that the shift lever is shifted to a position other than the parking range P, it is determined that the driver is ready to run the vehicle, and the foot illuminating device 40 may be turned out.

In this way, the foot illumination controller 50 controls the foot illuminating device 40 to turn on or turn off on the basis of various conditions.

Note that even when the above general turn-on conditions are satisfied, as described with reference to FIG. 1, when the image pick-up device 10 is picking up the image of the area on the passenger side of the vehicle and the image is being displayed on the display device 30, there is a possibility that the display image may be dazzling. Thus, the vehicle surroundings monitoring system 100 and the vehicle foot illuminating system 150 according to the present embodiment execute the following control.

When the foot illumination controller 50 detects that the image of the area on the passenger side of the vehicle, which is picked up by the image pick-up device 10 is being displayed on the display device 30 on the basis of states of the image pick-up device 10, display device 30, display switch 35 and/or image pick-up controller 20, the foot illumination controller 50 executes a control for turning off the foot illuminating device 40. In addition, when the foot illumination controller 50 receives a turn-off command signal for turning off the foot illuminating device 40 from the image pick-up controller 20 as well, the foot illumination controller 50 executes a control for turning off the foot illuminating device 40. In this way, even when the foot illuminating device 40 is, for example, in a normal turn-on control state, when the image of the area on the passenger side of the vehicle is being displayed, the foot illuminating device 40 is forcibly turned off to preferentially display the image of the area on the passenger side of the vehicle. Thus, it is possible to prevent the driver from viewing a dazzling image.

Note that the foot illumination controller 50 may detect that the display device 30 is displaying the image of the area on the passenger side of the vehicle on the basis of an input signal or an output signal of the image pick-up device 10 or may detect that on the basis of an input signal or an output signal of the display device 30. In addition, the foot illumination controller 50 may also detect that the image of the area on the passenger side of the vehicle should be displaying from an on/off state of the display switch 35. In this way, the foot illumination controller 50 is able to directly detect that the image of the area on the passenger side of the vehicle is being displayed on the basis of various operation signals and is able to execute an anti-glare control on the display device 30 on the basis of the detection.

In addition, the foot illumination controller 50 may detect that the display device 30 is displaying the image of the area on the passenger side of the vehicle on the basis of a control signal of the image pick-up controller 20. Because the image pick-up controller 20 controls the image pick-up device 10, the image pick-up controller 20 is able to output or transmit an image pick-up operating state signal that indicates that the image pick-up device 10 is picking up the image of the area on the passenger side of the vehicle. The foot illumination controller 50 detects the image pick-up operating state signal to thereby be able to reliably and early detect that the image pick-up device 10 is picking up the image of the area on the passenger side of the vehicle. Thus, it is possible to effectively and easily detect that the image of the area on the passenger side of the vehicle is being displayed using an on-board local area network (LAN), such as a control area network (CAN).

Furthermore, the foot illumination controller 50 may execute a foot illuminating control in accordance with a turn-off command signal received from the image pick-up controller 20. In the vehicle surroundings monitoring system 100 according to the present embodiment, when the image pick-up device 10 is picking up the image of the area on the passenger side of the vehicle, the image pick-up control is preferentially executed, and the foot illuminating device 40 is turned out. Thus, the image pick-up controller 20 is able to determine whether to turn off the foot illuminating device 40. Thus, it is applicable that the image pick-up controller 20 outputs a turn-off command signal, and the foot illumination controller 50 just executes a control for turning off the foot illuminating device 40 in accordance with the turn-off command signal.

The foot illumination controller 50 may be configured to detect that the turn signal lamp 70 is turned on. As described with reference to FIG. 1, when the turn signal lamp 70 is also provided on the side surface of the vehicle 200 on the passenger side and the illuminating area of the turn signal lamp 70 overlaps the image pick-up area of the image pick-up device 10, it also leads to a situation that the driver is dazzled by the image of the area on the passenger side of the vehicle.

However, the turn signal lamp 70 is a device that indicates intention to indicate which way the vehicle 200 travels, and is required to turn on in accordance with regulations. Thus, it is necessary to turn on the turn signal lamp 70 in preference to display of the image of the area on the passenger side of the vehicle. Thus, when the foot illumination controller 50 detects that the turn signal lamp 70 is turned on, the foot illumination controller 50 executes a control for allowing the turn signal lamp 70 to turn on and transmitting the turn-on state of the turn signal lamp 70 to the image pick-up controller 20. By so doing, it is possible to notify the image pick-up controller 20 of the turn-on state of the turn signal lamp 70.

On the other hand, the image pick-up controller 20 executes a control for suppressing the image pick-up device 10 from picking up the image of the area on the passenger side of the vehicle on the basis of the turn-on state signal of the turn signal lamp 70 received from the foot illumination controller 20. Specifically, the image pick-up controller 20, for example, executes a control for reducing a luminance of portion of the image picked up by the image pick-up device 10, which is exposed to light, or reducing the entire luminance to thereby cause the display device 30 not to display a dazzling image.

In this way, when the foot illuminating device 40 or the turn signal lamp 70 is turned on while the vehicle side image is being displayed, control is executed for turning off the foot illuminating device 40 or suppressing the image pick-up device 10 from picking up the image of the area on the passenger side of the vehicle. Thus, it is possible to obtain the vehicle surroundings monitoring system 100 and the vehicle foot illuminating system 150 provided with anti-glare control.

Figure 4:
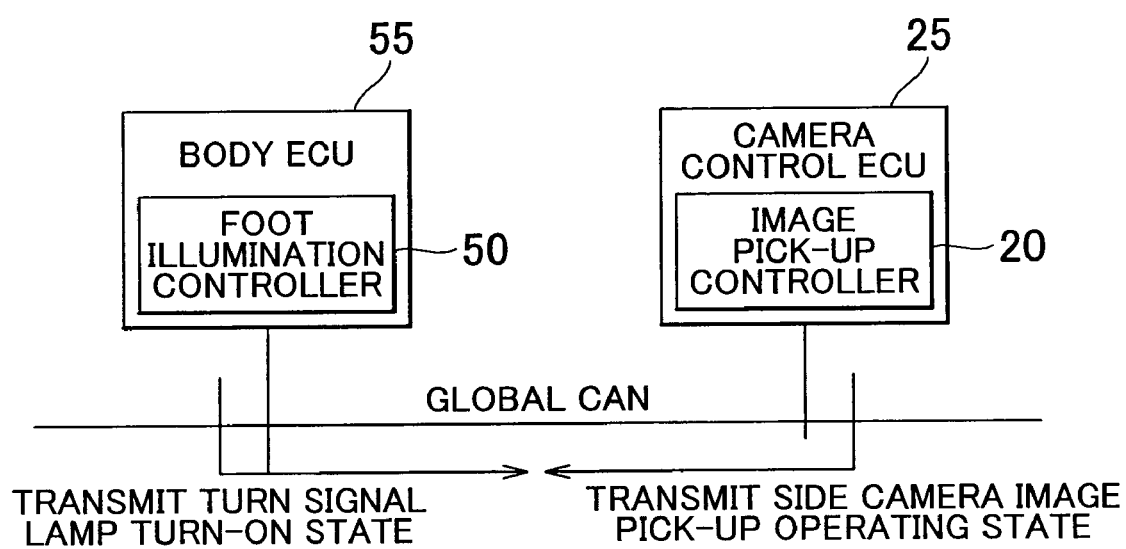
FIG. 4 is a view that shows an example implementing an anti-glare control, illustrated in FIG. 3, using a CAN.

FIG. 4 is a view that shows an example in which an anti-glare control illustrated in FIG. 3 is implemented using a global CAN. As shown in FIG. 4, the body ECU 55 that includes the foot illumination controller 50 and the camera control ECU 25 that includes the image pick-up controller 20 are connected through the global CAN to form an on-board network.

In FIG. 4, a side camera image pick-up operating state signal is transmitted from the camera control ECU 25 to the body ECU 55 that controls the foot illuminating device 40. The body ECU 55 that has received the side camera image pick-up operating state signal executes a process of turning off illumination of the foot illuminating device 40 as described with reference to FIG. 3. Note that a signal transmitted from the camera control ECU 25 may be a turn-off command signal that causes the foot illuminating device 40 to turn off as described above. Because the camera control ECU 25 is able to determine that the foot illuminating device 40 is turned off if the side camera is picking up an image, the camera control ECU may be configured to directly output a turn-off command signal for the foot illuminating device 40.

On the other hand, a turn signal lamp turn-on state signal is transmitted from the body ECU 55 to the camera control ECU 25 that controls the side camera of the image pick-up device 10. The camera control ECU 25 that has received the turn signal lamp turn-on state signal executes a process of suppressing the image picked up by the side camera.

In this way, by using an on-board network that uses a bus, such as a CAN, a local interconnect network (LIN), of the like, that connects the ECUs, the vehicle surroundings monitoring system 100 and the vehicle foot illuminating system 150 according to the present embodiment may also be configured as an electronic control system with a simple and effective data exchange.

Note that in FIG. 4, when the turn signal lamp turn-on state signal and the side camera image pick-up operating state signal or the turn-off command signal are transmitted, the turn signal lamp turn-on state signal is preferential. While the turn signal lamp 70 is turned on, control for suppressing the side camera of the image pick-up device 10 from picking up an image is initially executed, and after this, the image of the side camera returns to a normal state. Then, control for turning off the foot illuminating device 40 on the basis of the side camera image pick-up operating state signal or the turn-off command signal is executed.

This coincides with the priority described with reference to FIG. 3, and the body ECU 55 is allocated with a preferential ID in the CAN between the body ECU 55 and the camera control ECU 25. This also coincides with the control of the vehicle surroundings monitoring system 100 and vehicle foot illuminating system 150 according to the present embodiment.

In this way, the control executed in the vehicle surroundings monitoring system 100 and vehicle foot illuminating system 150 according to the present embodiment complies with the existing on-board network and, therefore, application of the control is easy.

Figure 5:
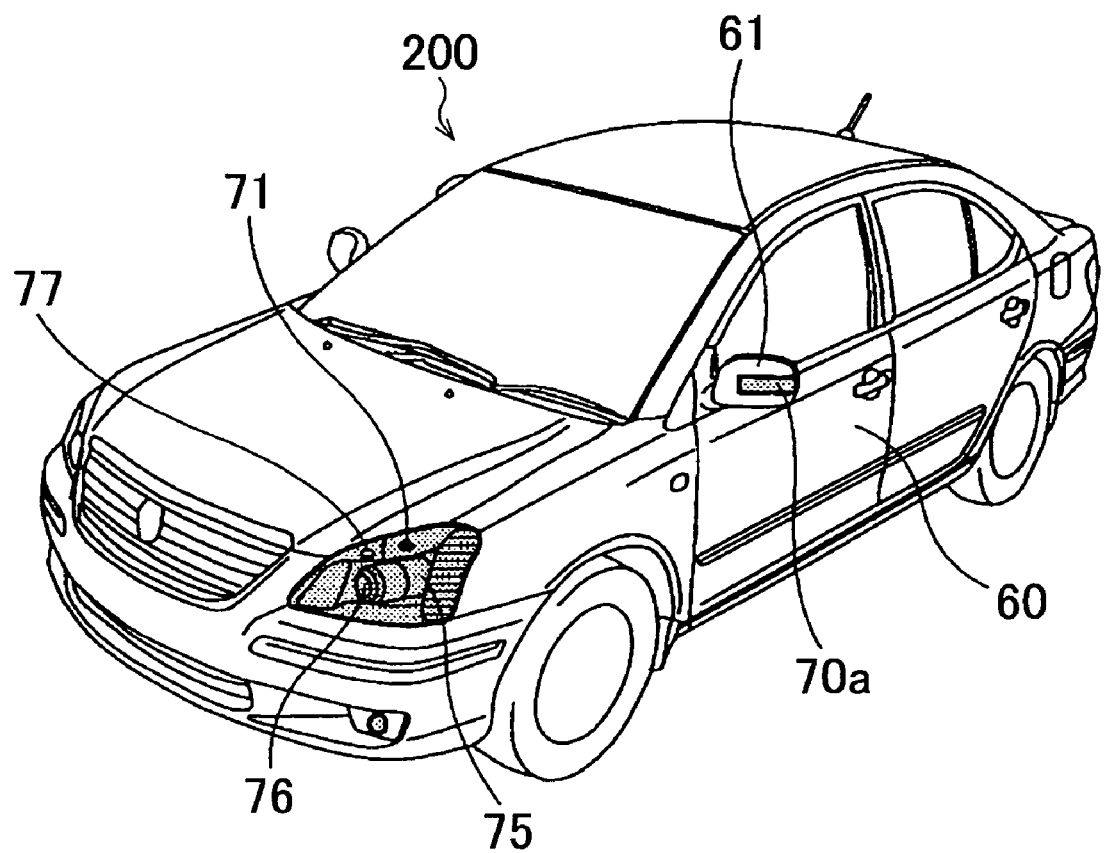
FIG. 5 is a view that illustrates a vehicle surroundings monitoring system and vehicle foot illuminating system according to an alternative embodiment of the invention.

FIG. 5 is a view that illustrates a vehicle surroundings monitoring system 100*a* and a vehicle foot illuminating system 150*a* according to an alternative embodiment to the vehicle surroundings monitoring system 100 and the vehicle foot illuminating system 150 according to the embodiment described with reference to FIG. 1 to FIG. 4. FIG. 5 is a perspective view of a vehicle 200*a* provided with the vehicle surroundings monitoring system 100*a* and the vehicle foot illuminating system 150*a* according to the alternative embodiment. Note that components not shown in FIG. 5 employ similar components as those of the above described embodiment, so that like references are assigned to similar components and description thereof is omitted.

In FIG. 5, the door mirror 61 is fixed to the front passenger door 60 of the vehicle 200*a*. Then, a side turn signal lamp 70*a* is provided at the outer side of the door mirror 61. On the other hand, a high beam head lamp 75, a low beam head lamp 76, a clearance lamp 77, and, in addition, a front turn signal lamp 71 are integrally provided at the passenger side of the vehicle 200*a*.

In this way, the vehicle 200*a* is provided with the side turn signal lamp 70*a* on the side surface of the vehicle 200*a*, the front turn signal lamp 71 at an end of the front surface adjacent to the passenger side. Thus, the plurality of turn signal lamps 70*a* and 71 are provided. The turn signal lamps 70*a* and 71 are required to indicate an intended running direction through turning on the lamp in accordance with regulations. Thus, when the driver operates to turn on the left-turn turn signal lamps 70*a* and 71, it is necessary to comply with that operation. In the case of the vehicle 200*a* provided with the plurality of turn signal lamps 70*a* and 71, it is applicable that the front turn signal lamp 71, which is more important for direction indication, is configured as in the existing turn signal lamp, and the side turn signal lamp 70*a* is configured to also serve as the foot illuminating device 40.

That is, it is applicable that while the vehicle 200*a* is running, the side turn signal lamp 70*a* operates in accordance with operation of the driver, that is, turns on or off as in a similar manner to the front turn signal lamp 71, and when the vehicle 200*a* is parked or stopped, the side turn signal lamp 70*a* is isolated from operation of the driver's direction indication, and is controlled to operate as the foot illuminating device 40. The above operation may be implemented so that the foot illumination controller 50, when the shift lever position detector 80 (see FIG. 3), for example, detects that the shift lever is at the parking range P controls the side turn signal lamp 70*a* to operate as the foot illuminating device 40. At this time, when the manner to turn on the side turn signal lamp 70*a* is varied from the normal front turn signal lamp 71, that is, the side turn signal lamp 70*a* does not blink but continuously turns on, it may be clearly distinguished from turn-on of the normal turn signal lamp, such as the front turn signal lamp 71.

Note that as described with reference to FIG. 1, the side turn signal lamp 70*a* is able to illuminate a road surface around passenger's feet on the passenger side in a sufficient range even without being oriented downward. Thus, it is possible to sufficiently perform the function as the foot illuminating device 40.

In this way, according to the vehicle surroundings monitoring system 100*a* and the vehicle foot illuminating system 150*a*, when both the front turn signal lamp 71 and the side turn signal lamp 70*a* are provided, the side turn signal lamp 70*a* is operated as the foot illuminating device 40 to eliminate the necessity of separately providing the foot illuminating device 40. Thus, it is possible to implement the vehicle surroundings monitoring system 100*a* and the vehicle foot illuminating system 150*a* with a simple structure.

Note that in FIG. 5, the example in which the side turn signal lamp 70*a* is provided at the side mirror is described. Instead, the side turn signal lamp 70*a* may be provided at another location on the side surface of the vehicle 200*a*. In this case as well, the side turn signal lamp 70*a* is able to illuminate a road surface around passenger's feet on the passenger side, and if the front turn signal lamp 71 is additionally provided, the side turn signal lamp 70*a* may be operated as in a similar manner to that of the alternative embodiment.

Figure 6:
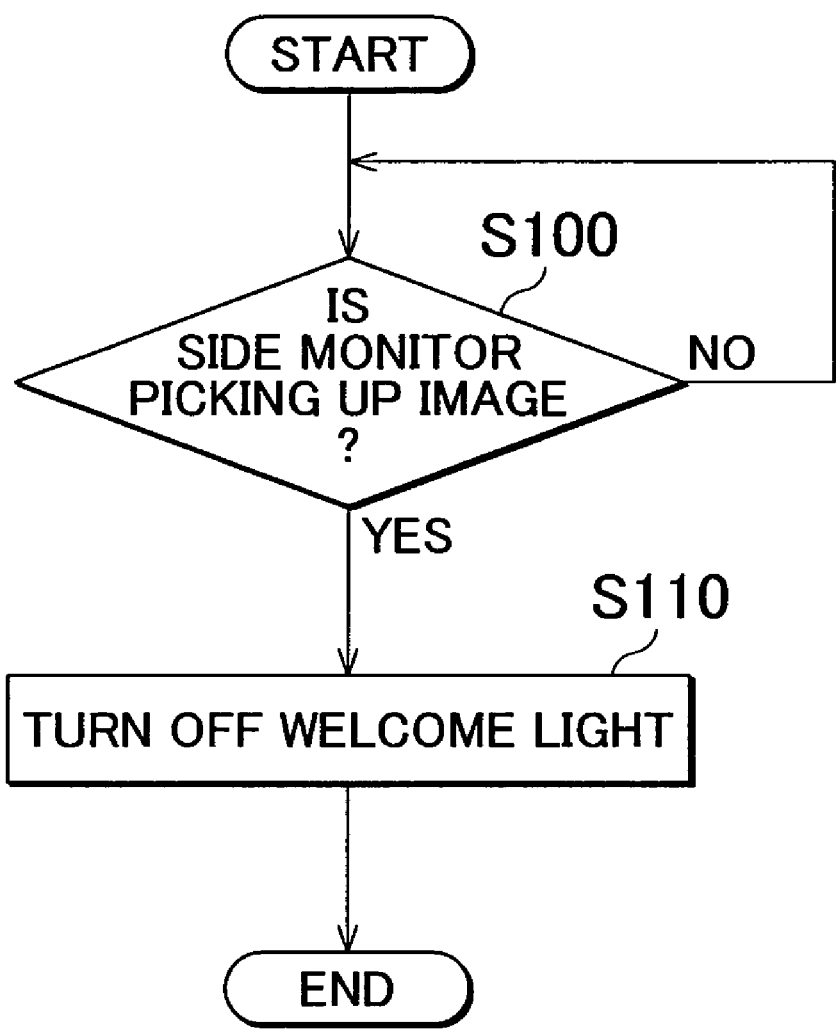
FIG. 6 is a process flowchart of the vehicle surroundings monitoring system and foot illuminating system according to the embodiment of the invention or the alternative embodiment of the invention.

Next, the schematic operation of the vehicle surroundings monitoring systems 100 and 100*a* and foot illuminating systems 150 and 150*a* according to the present embodiment and alternative embodiment will be described with reference to FIG. 6. FIG. 6 is a process flowchart that illustrates the schematic operation of the vehicle surroundings monitoring systems 100 and 100*a* and foot illuminating systems 150 and 150*a* according to the present embodiment and alternative embodiment.

In step 100, it is determined whether the side monitor, which serves as the image pick-up device 10, is picking up an image. The above determination is made so that a signal that indicates whether the image pick-up device 10 is picking up an image is input to the foot illumination controller 50. Whether the image pick-up device 10 is picking up an image may be determined by detecting a signal transmitted from the image pick-up device 10 to the display device 30 or by detecting a signal transmitted from the display switch 35 to the image pick-up device 10. In addition, a side monitor image pick-up operating state signal or a turn-off command signal may be transmitted from the image pick-up controller 20, provided in the camera control ECU 25, to the foot illumination controller 50 via the network.

Note that the determination in step 100 may be made so that event information is constantly transmitted, for example, at an interval of about 1000 (msec) from the image pick-up device 10 and/or the image pick-up controller 20 to the foot illumination controller 50 and the determination is made on the basis of the event information as needed.

In step 100, when the side monitor is not picking up an image, the operation of the step 100 is repeated at intervals as described above. On the other hand, when the image pick-up device 10, that is, the side monitor, is picking up an image, the process proceeds to step 110.

In step 110, the foot illumination controller 50 executes, a control for turning off the foot illuminating device 40 or the side turn signal lamp 70a, which serves as a welcome light, after which the process ends. Thus, the driver is able to avoid feeling the image of the area on the passenger side of the vehicle displayed on the display device 30 dazzling, and a side monitor image is displayed in a favorable state.

In this way, according to the vehicle surroundings monitoring systems 100 and 100a and the foot illuminating systems 150 and 150a, when the image pick-up device 10, that is, the side monitor, is picking up an image, even when the condition that the foot illuminating device 40 or the side turn signal lamp 70a that serves as the foot illuminating device 40 is turned on or turns on is satisfied, control for turning off the foot illuminating device 40 or the side turn signal lamp 70a is executed. Thus, it is possible for the driver to desirably view the image of the area on the passenger side of the vehicle using the side monitor.

Next, the detailed example of the normal turn-on operation and normal turn-off operation of the vehicle foot illuminating system 150 according to the present embodiment and vehicle foot illuminating system 150a according to the present alternative embodiment will be described with reference to FIG. 7. FIG. 7 is a state transition diagram of turn-on/turn-off of the vehicle foot illuminating system 150 according to the embodiment or the vehicle foot illuminating system 150a according to the alternative embodiment.

In FIG. 7, the left side indicates a turn-off state, and the right side indicates a turn-on state. In the vehicle surroundings monitoring systems 100 and 100a and the vehicle foot illuminating systems 150 and 150a according to the present embodiment and the alternative embodiment, it is directed to executing a control for not preventing the driver from viewing the side monitor. Thus, in FIG. 7, it is assumed that the driver has been already seated in the vehicle 200 or 200a, and a fellow passenger will get into a passenger seat.

In FIG. 7, first, the foot illuminating device 40 is turned out. Here, as a first condition, when the driver unlocks the front passenger door 60, the foot illumination controller 50 determines that the driver unlocked the door to allow the fellow passenger to get in and turns on the foot illuminating device 40 (including the side turn signal lamp 70a that serves as the foot illuminating device 40, and the same applies to the following description). The unlocking of the front passenger door 60 may be detected by the passenger seat door lock detector 62.

At this time, the precondition that the driver has been already seated in the vehicle 200 or 200a may be determined on the basis of the on-state of the vehicle power 90, that is, whether the power switch 91 is turned on. The on-state of the power switch 91 may satisfy the condition when any one of an accessory power or an ignition power is turned on depending on the configuration of the vehicle 200 or 200a or may satisfy the condition when the ignition power is turned on.

In addition, it may be added to the turn-on condition that the situation in which the fellow passenger will get into the passenger seat is that the vehicle 200 or 200a is parked or stopped. For example, when the condition includes that the vehicle is parked, it may be set to the condition that the shift lever position detector 80 detects that the shift lever is at the parking range P. When the condition includes that the vehicle is stopped, it may be set to the condition that the shift lever position detector 80 detects that the shift lever is at the neutral N. Furthermore, it may be added to the condition that a vehicle speed sensor indicates zero, where necessary.

When the first condition is satisfied and then the foot illuminating device 40 turns on, the timer 51 measures the duration of illumination, and the foot illumination controller 50 controls the foot illuminating device 40 so as to be turned on only for a predetermined period of time. The predetermined period of time may be set to time that is presumably sufficient for the fellow passenger to get into the passenger seat of the vehicle 200 or 200a and, for example, may be set to about 15 seconds.

In a second condition, after the predetermined period of time has elapsed from time when the front passenger door 60 is unlocked, the foot illumination controller 50 controls the foot illuminating device 40 to turn out.

In addition, as a third condition, even when the foot illuminating device 40 is turned on, when the front passenger door 60 is locked and the passenger seat door lock detector 62 detects the locking of the front passenger door 60, the foot illumination controller 50 determines that the fellow passenger has been seated in the vehicle and controls the foot illuminating device 40 to turn out.

Furthermore, as a fourth condition, even when the foot illuminating device 40 is turned on, when it is determined that the driver is ready to drive, the foot illumination controller 50 controls the foot illuminating device 40 to turn out. For example, when the shift lever position detector 80 detects that the shift lever is at a position other than the parking range P and the ignition power is on, the foot illumination controller 50 may determine that the driver is ready to drive. In addition, when the first turn-on condition not only includes that the shift lever is at the parking range P but also at the neutral range N, the shift lever position detector 80 may determine that the driver is ready to drive when the shift lever is at a position other than the parking range P or the neutral range N.

In this way, by appropriately setting the turn-on condition and turn-off condition for the foot illuminating device 40, the vehicle foot illuminating systems 150 and 150a may be configured to make it possible for the fellow passenger to further comfortably get into the vehicle and to reliably turn off the foot illuminating device 40 when it is no longer necessary. Note that the conditions described here are illustrative, and various conditions may be set in response to applications.

Figure 8:
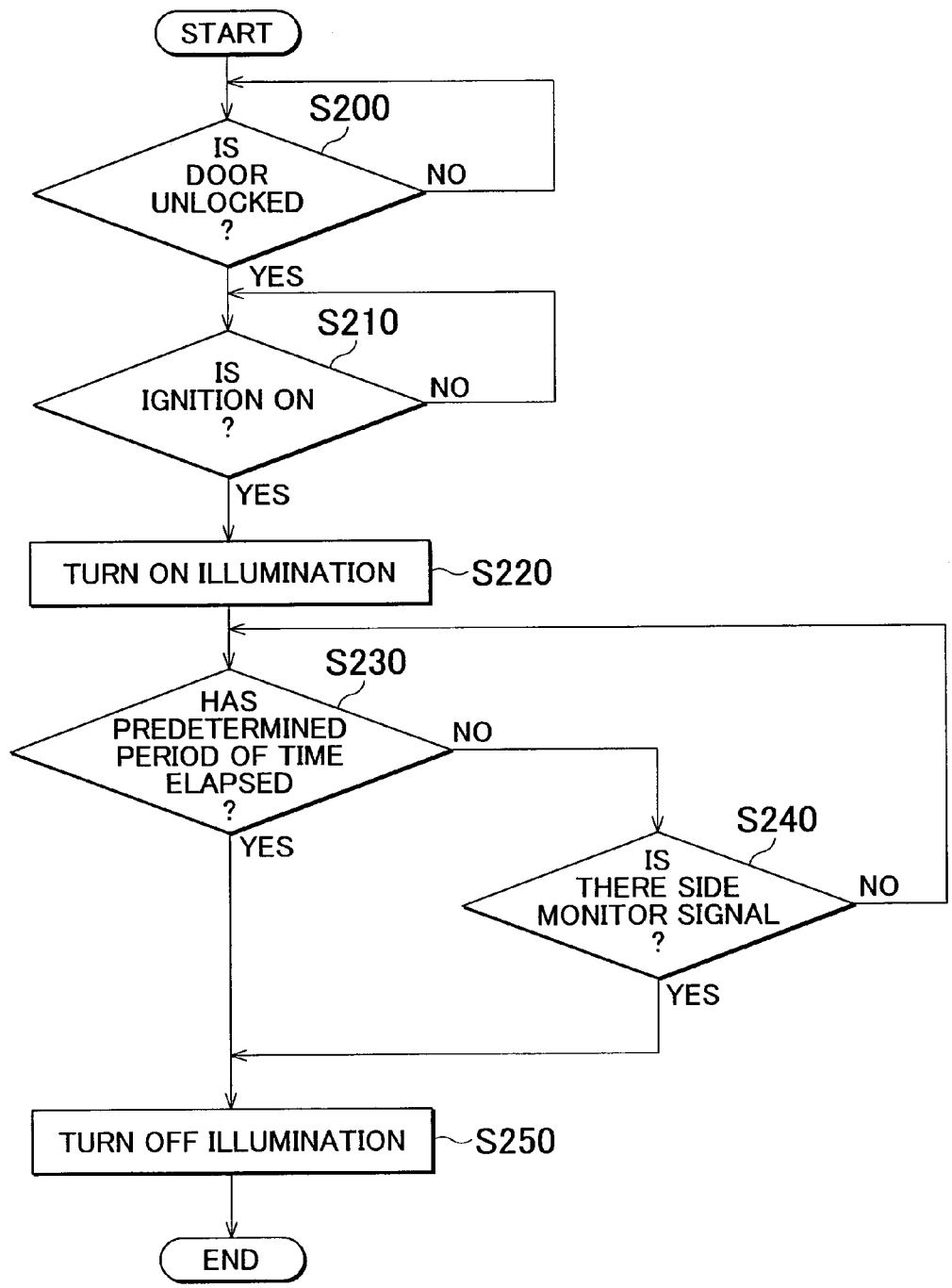
FIG. 8 is a detailed process flowchart of the vehicle surroundings monitoring system and vehicle foot illuminating system according to the embodiment of the invention or the alternative embodiment of the invention.

Next, an operation example of the case in which control functions of the vehicle surroundings monitoring systems 100 and 100a and vehicle foot illuminating systems 150 and 150a according to the present embodiment and the present alternative embodiment are applied in the vehicle foot illuminating systems 150 and 150a that execute a normal foot illuminating control as shown in FIG. 7 will be described with reference to FIG. 8. FIG. 8 is a process flowchart that shows the further detailed operation of the vehicle surroundings monitoring systems 100 and 100a and vehicle foot illuminating systems 150 and 150a according to the present embodiment and the present alternative embodiment.

In step 200, it is determined whether the front passenger door 60 is unlocked. This is described in the first condition shown in FIG. 7. An unlock signal for the front passenger door 60 is detected by the passenger seat door lock detector 62, and the detected signal is input to the foot illumination controller 50 to be determined. When no unlock signal is detected, the process of step 200 is repeated. When the unlock signal is detected, the process proceeds to step 210.

In step 210, it is determined whether the ignition switch of the ignition power is on from among the power switches 91 of the vehicle power 90. This corresponds to the condition that the driver is seated, which is the first condition described with reference to FIG. 7, and in the process flow of FIG. 8, it is required that the ignition is on. A detected signal that the ignition is on is input to the foot illumination controller 50, and the condition is determined in the foot illumination controller 50.

In step 220, the foot illumination controller 50 controls the foot illuminating device 40 to turn on, so that the foot illuminating device 40 turns on. Note that the side turn signal lamp 70*a* may also serve as the foot illuminating device 40, which is similar to the above description and will be similar to the following description. Here, the condition that the foot illuminating device 40 turns on does not include the condition that the foot illuminating device 40 turns on when the shift lever is at the parking range P. In this way, the turn-on condition of the foot illuminating device 40 may apply appropriate conditions.

In step 230, after the foot illumination controller 50 determines whether a predetermined period of time has elapsed since the foot illuminating device 40 turns on. Measurement of the predetermined period of time may be performed, for example, by the timer 51 that is installed in the foot illumination controller 50.

In step 230, when the predetermined period of time has elapsed, the process proceeds to step 250. The foot illumination controller 50 controls the foot illuminating device 40 to turn out. Thus, the foot illuminating device 40 turns out. When the predetermined period of time, for example, about 15 seconds, that is sufficient for the fellow passenger to get into the vehicle has elapsed, the foot illumination controller 50 determines that the foot illuminating device 40 has completed its role and then the foot illuminating device 40 is turned out, after which the process flow ends.

On the other hand, in step 230, when the predetermined period of time has not elapsed, the process proceeds to step 240.

In step 240, the foot illumination controller 50 determines whether the side monitor signal is detected. As described with reference to FIG. 6, the side monitor signal may be detected from a transmission signal, such as a signal of the display device 30, a signal between the image pick-up device 10 and the display device 30, a signal between the image pick-up device 10 and the display switch 35, or a side monitor in-imaging signal of the image pick-up controller 20 in the camera control ECU 25. In addition, in place of the side monitor signal, the turn-off command signal may be output from the image pick-up controller 20.

In step 240, when the foot illumination controller 50 detects no side monitor signal or no turn-off command signal, the process returns to step 230, and the determination as to whether the predetermined period of time has elapsed is performed again, after which the process flow is repeated.

On the other hand, in step 240, when the foot illumination controller 50 determines that the side monitor signal or the turn-off command signal is detected, the process proceeds to step 250, and then the foot illumination controller 50 controls the foot illuminating device 40 to turn out. By so doing, even when the predetermined period of time has not elapsed since the foot illuminating device 40 turns on, when the image pick-up device 10 is in side monitoring and is picking up the image of the area on the passenger side of the vehicle, it is possible to turn off the foot illuminating device 40 and display the image of the area on the passenger side of the vehicle, which is displayed on the display device 30 in a favorable state.

In this way, according to the process flow of FIG. 8, step 240 is added to the turn-on/turn-off control for the normal foot illuminating device 40, and even when the predetermined period of time has not elapsed, when turn-on of the foot illuminating device 40 influences the driver's view at the image of the area on the passenger side of the vehicle, it is possible to turn off the foot illuminating device 40 and it is possible to preferentially display the image of the area on the passenger side of the vehicle, which is higher in priority for safety.

Thus, when the function of allowing the fellow passenger to comfortably get into the vehicle 200 or 200*a* using the foot illuminating device 40 is provided but the image of the area on the passenger side of the vehicle is viewed using the image pick-up device 10, the image of the area on the passenger side of the vehicle is preferentially displayed in a favorable manner. Thus, the vehicle surroundings monitoring systems 100 and 100*a* and the vehicle foot illuminating systems 150 and 150*a* are able to achieve both safety and comfort.

Example embodiments according to the invention are described in detail above. The aspects of the invention are not limited to the above embodiments but they may be modified or replaced in various forms from the above embodiments without departing from the scope of the invention.

The invention claimed is:

1. A vehicle surroundings monitoring system comprising:
    an image pick-up device that picks up an image of an area on the passenger side of a vehicle;
    a display device that displays the image of the area on the passenger side of the vehicle, which is picked up by the image pick-up device;
    a foot illuminating device that illuminates the ground outside the vehicle on the passenger side; and
    a foot illumination controller that controls the foot illuminating device, wherein
    when the image of the area on the passenger side of the vehicle, which is picked up by the image pick-up device, is being displayed on the display device, the foot illumination controller turns off the foot illuminating device.

2. The vehicle surroundings monitoring system according to claim 1, wherein
    the image pick-up device and the foot illuminating device are provided at a passenger side door mirror.

3. The vehicle surroundings monitoring system according to claim 1, further comprising:
    an image pick-up controller that controls the image pick-up device, wherein
    the image pick-up controller transmits an image pick-up operating state signal or a turn-off command signal to the foot illumination controller when the image pick-up controller is controlling the image pick-up device to pick up an image, and
    the foot illumination controller turns off the foot illuminating device when the foot illumination controller has detected the image pick-up operating state signal or the turn-off command signal.

4. The vehicle surroundings monitoring system according to claim 1, further comprising:
    an image pick-up controller that controls the image pick-up device, wherein
    the foot illumination controller controls the foot illuminating device to serve as a turn signal lamp when the vehicle is running, and transmits a turn-on state signal to the image pick-up controller when the turn signal lamp is turned on, and the image pick-up device reduces a luminance of the picked up image when the image pick-up device receives the turn-on state signal from the foot illumination controller.

5. The vehicle surroundings monitoring system according to claim 1, wherein while the image of the area on the passenger side of the vehicle is not being displayed on the display device, the foot illumination controller turns on the foot illuminating device for a predetermined period of time when a vehicle power is on and a front passenger door is unlocked.

6. The vehicle surroundings monitoring system according to claim 1, wherein the foot illumination controller controls the foot illuminating device to serve as a turn signal lamp when the vehicle is running.

7. The vehicle surroundings monitoring system according to claim 1, wherein the area picked up by the image pick-up device at least partially overlaps an area illuminated by the foot illuminating device.

8. A vehicle foot illuminating system comprising:

a foot illuminating device that illuminates the ground outside a vehicle on the passenger side;

a display device that displays a picked up image of an area on the passenger side of the vehicle; and a foot illumination controller that controls the foot illuminating device, wherein the foot illumination controller turns off the foot illuminating device when the image of the area on the passenger side of the vehicle is being displayed on the display device.

9. The vehicle foot illuminating system according to claim 8, wherein the foot illuminating device is provided at a passenger side door mirror.

10. The vehicle foot illuminating system according to claim 8, wherein while the image of the area on the passenger side of the vehicle is not being displayed on the display device, the foot illumination controller turns on the foot illuminating device for a predetermined period of time when a vehicle power is on and a passenger door is unlocked.

11. The vehicle foot illuminating system according to claim 10, wherein the foot illumination controller turns off the foot illuminating device when the front passenger door is locked.

12. The vehicle foot illuminating system according to claim 10, wherein the foot illumination controller turns off the foot illuminating device when a shift lever is at a position other than a parking range.

13. The vehicle foot illuminating system according to claim 8, wherein the area imaged by an image pick-up device at least partially overlaps an area illuminated by the foot illuminating device.

* * * * *